United States Patent [19]
Schneider

[11] 3,892,554
[45] July 1, 1975

[54] 2-AMINO-4-ISOPROPYLAMINO-6-CHLORO-PYRIMIDINE IN MAIZE, WHEAT, POTATOES, ONIONS AND LEEKS

[75] Inventor: Rupert Schneider, Riehen, Switzerland

[73] Assignee: Sandoz Ltd., Basel, Switzerland

[22] Filed: Aug. 24, 1971

[21] Appl. No.: 174,568

Related U.S. Application Data

[63] Continuation-in-part of Ser. No. 10,056, Feb. 9, 1970, abandoned.

[30] Foreign Application Priority Data

Feb. 14, 1969  Switzerland.......................... 2234/69

[52] U.S. Cl............................. 71/92; 260/256.4 N
[51] Int. Cl............................................. A01n 9/22
[58] Field of Search.......................................... 71/92

[56] References Cited
UNITED STATES PATENTS

| | | | |
|---|---|---|---|
| 3,118,754 | 1/1964 | Nickell................................... | 71/92 |
| 3,284,188 | 11/1966 | Amagasa et al. ...................... | 71/92 |

FOREIGN PATENTS OR APPLICATIONS

| | | | |
|---|---|---|---|
| 1,170,743 | 9/1958 | France................................... | 71/92 |
| 347,672 | 8/1960 | Switzerland............................ | 71/92 |
| 662,501 | 4/1964 | Italy....................................... | 71/92 |

OTHER PUBLICATIONS

Forrest et al., J. Chem. Soc., pp. 3–7 (1951).
Noell et al., Journal Med. Pharm. 5, pp. 559–588 (1962).

*Primary Examiner*—James O. Thomas, Jr.
*Attorney, Agent, or Firm*—Gerald D. Sharkin; Richard E. Vila

[57] ABSTRACT

The invention concerns pyrimidine derivatives of the formula

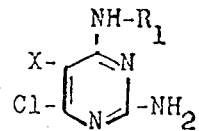

in which
  $R_1$ is an alkyl radical of 2 to 6 carbon atoms, an alkenyl radical of 3 to 6 ring carbon atoms, or a cycloalkyl radical of 5 or 6 ring carbon atoms, and
  X is hydrogen or halogen preferably chlorine,
or agriculturally acceptable acid addition salts thereof.
The compounds possess herbicidal activity.

10 Claims, No Drawings

2-AMINO-4-ISOPROPYLAMINO-6-CHLORO-PYRIMIDINE IN MAIZE, WHEAT, POTATOES, ONIONS AND LEEKS

This application is a continuation-in-part of co-pending application Ser. No. 10,056, filed Feb. 9, 1970, now abandoned.

The present invention relates to pyrimidine derivatives.

This invention provides herbicidally active compounds of formula I,

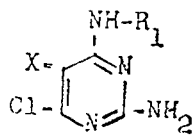  I in which

R₁ is an alkyl radical of 2 to 6 carbon atoms, an alkenyl radical of 3 to 6 carbon atoms, or a cycloalkyl radical of 5 or 6 ring carbon atoms, and X is hydrogen or halogen preferably chlorine, or agriculturally acceptable acid addition salts thereof.

This invention also provides processes for the production of compounds of formula I, characterized by a. reacting a compound of formula II,

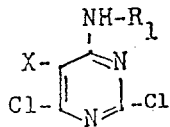  II in which R₁ and X are as defined above, with ammonia, or b. producing a compound of formula Ia,

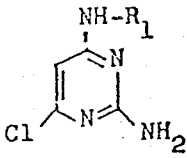  Ia in which R₁ is as defined above, by reacting a compound of formula III

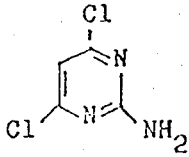  III with an amine of formula IV,

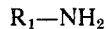  IV in which R₁ is as defined above, or c. producing a compound of formula Ib,

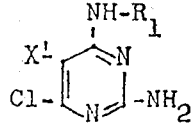  Ib in which

X' is halogen, and

R₁ is as defined above, by halogenating a compound of formula Ia defined above.

Process (a) may for example be effected with a concentrated aqueous ammonia solution, and suitably in a water-miscible organic solvent which is inert under the reaction conditions, e.g. an alcohol. The process is suitably effected at a temperature of from 100° to 180°C, preferably 120° to 160°C. The process may desirably be carried out in a pressure vessel.

Process (b) may be effected in conventional manner for example in an organic solvent which is inert under the reaction conditions, e.g. an alcohol, and at the reflux temperature of the reaction mixture. Suitably, the compounds of formula III and IV may be employed in a molar ratio of 1:2.

Process (c) may be effected in conventional manner.

The resulting compounds of formula I may be isolated and purified in conventional manner. Where required, free base forms of the compounds of formula I may be converted to acid addition salt forms in conventional manner, and, likewise, vice versa.

Examples of agriculturally acceptable acid addition salts of the compounds of formula I are the methane sulphonates, hydrogen sulphates, hydrochlorides, hydrobromides, phosphates and trichloroacetates.

The compounds of formula II employed as starting materials in process (c) may be produced by reacting a compound of formula V,

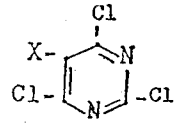  V in which X is as defined above, with a compound of formula IV stated above.

The process may be effected in conventional manner, for example in an organic solvent which is inert under the reaction conditions. It is suitably effected at room temperature or slightly elevated temperature and the reaction time may typically vary from one-half to 2 hours. This process may lead to a mixture of the desired compounds of formula II and other aminated pyrimidines. The compounds of formula II may then be isolated, for example by steam distillation.

The compounds of formulae III, IV and V are either known or may be produced in manner known per se.

The compounds of formula I and their agriculturally acceptable acid addition salts are useful because they possess herbicidal activity against the growth of weeds, in particular against dicotyledonous weeds, e.g. *Plantago lanceolata, Amaranthus retroflexus, Capsella bursa-pastoris, Chenopodium album, Calium aparine, Stellaria media* and *Senecio vulgaris,* as well as against undesired grasses, for example *Echinochloa crus-galli, Alopecurus pratensis* and *Setaria sp.*

The compounds are furthermore useful because they exhibit selectivity against weeds amidst cultivated plants. Thus, for example, maize, wheat, potatoes, onions and leeks are not significantly damaged by the use of the herbicides of the invention, either before or after, and particularly after, emergence of the cultured plants and the weeds.

In general, the compounds of the invention may be applied in an amount of from 1 to 12 kg, preferably 2 to 6 kg, per hectare.

For use as herbicides, the compounds of formula I or their agriculturally acceptable acid addition salts may be formulated into suitable compositions, e.g. suspensions, emulsions, pastes and granules. The herbicidal compositions may be produced, for example, by intimately mixing or grinding the compounds of formula I with a suitable carrier, optionally with the addition of dispersing agents or a solvent which is inert to the active agent.

In order to produce compositions which can be applied in solid forms, e.g. dusting and strewing powders and granulates, the compounds of the invention may be mixed with solid carriers, e.g. kaolin, talc, chalk and limestone.

Substances improving adhesiveness, wettability and dispersibility may also be incorporated into the compositions.

Spraying powders may be obtained by mixing and grinding the compounds with a powdery carrier material until the mixture is homogeneous. The powdery carrier may for example be kaolin, talc, chalk, limestone and cellulose powder.

In order to produce liquid forms of the composition one or more compounds of the invention are dissolved in an organic solvent or solvent mixture or water. Examples of suitable organic solvents are ketones such as acetone, alcohols, hydrocarbons, chlorinated hydrocarbons and alkyl naphthalenes, alone or in admixture.

For special purposes, the compounds of the invention may be combined with other herbicides, e.g. of the urea class, saturated or unsaturated halogen fatty acids, halogen benzonitriles, halogen benzoic acids, phenoxyalkyl carboxylic acids, carbamates and triazines.

Application forms of compositions containing compounds of formula I or their agriculturally acceptable acid addition salts as active agent generally contain 0.01 to 10% by weight of active agent. Concentrates generally contain 5 to 50% by weight of active agent.

The herbicidal compositions can for example be applied as a liquid spray or a dust to the plant locus to be protected from the weeds. Such application can be made directly to the locus, pre- or post-emergence of the weeds.

In the following Examples a and b, which illustrate application forms of the herbicides of the invention, parts are by weight.

EXAMPLE a 10 parts of 2-amino-4-isopropylamino-6-chloropyrimidine are mixed with 25 parts of isooctylphenyl decaglycol ether and 65 parts of acetone. The resulting emulsion is diluted with water to the desired concentration before use.

EXAMPLE b 25 parts of 2-amino-4-(2-methyl-ethylamino)-6-chloropyrimidine hydrochloride are mixed with 5 parts of a condensation product of formaldehyde and naphthalene sulphonate, 2 parts of alkylbenzene sulphonate, 5 parts of dextrin, 1 part of ammonium caseinate and 62 parts of diatomaceous earth until a homogeneous mixture results and this is subsequently ground until the particles are considerably smaller than 45 microns. This formulation is diluted with water to the desired concentration before use.

The herbicidal effect of the compounds of formula I and their agriculturally acceptable acid addition salts is indicated in the following Table. The scale 1 to 9 employed in the Table signifies: 1 = no destruction, 9 = total destruction. The following Table shows the effect of post-emergence treatment with 3 kg of active agent per hectare.

The Table shows the herbicidal effect of the agents of the invention and also their selectivitiy in culturing plants, e.g. maize.

| Active ingredient of the herbicide | Amaranthus retroflexus | Capsella bursa-pastoris | Chenopodium album | Galium aparine | Stellaria media | Senecio vulgaris | Echinochlea crusgalli | Maize |
| --- | --- | --- | --- | --- | --- | --- | --- | --- |
| 2-amino-4-isopropylamino-6-chloro-pyrimidine | 9 | 9 | 9 | 7 | 9 | 9 | 9 | 1 |
| 2-amino-4-isopropylamino-6-chloro-pyrimidine hydrochloride | 9 | 9 | 9 | 9 | 9 | 9 | 9 | 1 |
| 2-amino-4-isopropylamino-6-chloro-pyrimidine trichloroacetate | 9 | 9 | 9 | 7 | 9 | 9 | 9 | 1 |
| 2-amino-4-propylamino-6-chloro-pyrimidine | 9 | 9 | 9 | 5 | 9 | 9 | 7 | 1 |
| 2-amino-4-allylamino-6-chloro-pyrimidine | 9 | 7 | 8 | 6 | 9 | 9 | 6 | 1 |
| 2-amino-4-isobutylamino-6-chloro-pyrimidine | 9 | 9 | 9 | 6 | 9 | 9 | 7 | 1 |
| 2-amino-4-pentylamino-6-chloro-pyrimidine | 9 | 9 | 6 | 9 | 9 | 9 | 9 | 1 |
| 2-amino-4-cyclohexylamino-6-chloro-pyrimidine | 9 | 9 | 6 | 9 | 9 | 9 | 9 | 1 |
| 2-amino-4-n-butylamino-6-chloro-pyrimidine | 9 | 9 | 8 | 7 | 9 | 9 | 8 | 1 |
| 2-amino-4-n-hexylamino-6-chloro-pyrimidine | 9 | 9 | 9 | 9 | 9 | 9 | 9 | 1 |
| 2-amino-4-sec-butylamino-6-chloro-pyrimidine | 9 | 9 | 9 | 9 | 9 | 9 | 9 | 1 |

EXAMPLE 1:

2-Amino-4-isopropylamino-6-chloro-pyrimidine 400 g (2.18 mols) of 2,4,6-trichloro-pyrimidine are dissolved in 2000 cc of alcohol. 280 g (4.75 mols) of isopropyl amine in 200 cc of alcohol are added to the solution while stirring and cooling, the temperature being maintained below 30°. The mixture is subsequently stirred at room temperature for a further 60 minutes and the alcohol is then removed by evaporation in a water jet vacuum until the mixture hardens to a solid mass. The solid residue is washed with water and subjected to steam distillation. This distillation is continued until only traces of the steam-volatile 2-isopropylamino-4,6-dichloro-pyrimidine are deposited in the receiver. The steam-nonvolatile 4-isopropylamino-2,6-dichloro-pyrimidine is obtained. After distillation in a vacuum (B.P. 124°/0.1 mm of Hg) the pure product, having a M.P. of 69°–70° after recrystallization from water/alcohol, is obtained.

30 g (0.15 mols) of 4-isopropylamino-2,6-dichloro-pyrimidine in 100 cc of alcohol are mixed with 50 cc of a 23 % aqueous ammonia solution and the mixture is heated to 140° is an autoclave for 4 hours. The reaction mixture is subsequently evaporated to dryness in a vacuum, the solid residue is taken up in 300 cc of chloroform and washed thrice with 200 cc amounts of water. After drying with aluminium oxide and removing the chloroform by evaporation a viscous oil is obtained which solidifies slowly. The resulting 2-amino-4-isopropylamino-6-chloro-pyrimidine has a M.P. of 114°–116° after recrystallization from benzene/petroleum ether.

Analysis: $C_7H_{11}ClN_4$ Molecular weight: 186.7; Calc.: C 45.1; H 6.0; N 30.0; Cl 19.0 %; Found: C 45.4; H 6.1; N 29.8; Cl 18.8 %

EXAMPLE 2:

2-Amino-4-isopropylamino-6-chloro-pyrimidine 600 g of 2-amino-4,6-dichloro-pyrimidine (3.66 mols) are added to 3000 cc of alcohol, 395 g of isopropylamine (8.05 mols) are added, and the mixture is slowly heated to 80° during the course of 2 hours while stirring. After the material is dissolved, the solution is heated under reflux for 3 hours. The alcohol is then distilled off and the residue dissolved in dilute sulphuric acid. The solution must give a clearly acid reaction. The solution is shaken out several times with chloroform. A layer of 3000 cc of chloroform is subsequently placed under the aqueous solution and the solution is made alkaline with a caustic soda solution (pH 11), whereby the temperature should not exceed 35°. After shaking out the chloroform phase is separated and the aqueous phase is again shaken out with chloroform. The combined chloroform solution is dried with Glauber's salt after washing with water and the chloroform is evaporated. After standing for a short time the oily residue crystallizes. The product may be recrystallized as described in Example 1 for purposes of purification.

EXAMPLE 3:

2-Amino-4-isopropylamino-5,6-dichloro-pyrimidine 20 g (0.1 mol) of 2-amino-4-isopropylamino-6-chloropyrimidine in 250 cc of carbon tetrachloride are heated to reflux temperature while stirring. As soon as a clear solution results, chlorine is slowly passed through the solution until the taking up of chlorine stops. After about 90 minutes the solution is cooled, the precipitated material is filtered with suction and washed with carbon tetrachloride. The product may be recrystallized from dioxane. M.P. 193° (decomp.).

Analysis: $C_7H_{10}Cl_2N_4$ Molecular weight: 221; Calc.: C 38.0; H 4.6; Cl 32.1; N 25.3 %; Found: C 38.4; H 4.8; Cl 31.7; N 25.1 %

The following compounds may be obtained in a manner analogous to that described in Examples 1 and 2:

| Example No. | | Formula | Molecular weight | Melting point | Analysis % Calculated Found | | | |
|---|---|---|---|---|---|---|---|---|
| | | | | | C | H | Cl | N |
| 4 | 2-amino-4-n-hexylamino-6-chloro-pyrimidine | $C_{10}H_{17}ClN_4$ | 228.7 | 95–96° | 52.5 | 7.5 | 15.5 | 24.5 |
| | | | | | 53.0 | 7.4 | 15.1 | 23.9 |
| 5 | 2-amino-4-cyclohexylamino-6-chloro-pyrimidine | $C_{10}H_{15}ClN_4$ | 225.7 | 138–140° | 53.2 | 6.3 | 15.7 | 24.8 |
| | | | | | 53.5 | 6.4 | 15.4 | 24.6 |
| 6 | 2-amino-4-sec-butylamino-6-chloro-pyrimidine | $C_8H_{13}ClN_4$ | 200.7 | 96–97° | 47.9 | 6.5 | 17.7 | 27.9 |
| | | | | | 48.5 | 6.4 | 18.0 | 27.3 |
| 7 | 2-amino-4-isobutylamino-6-chloro-pyrimidine | $C_8H_{13}ClN_4$ | 200.7 | 108–109° | 47.9 | 6.5 | 17.7 | 27.9 |
| | | | | | 48.1 | 6.8 | 17.7 | 28.1 |
| 8 | 2-amino-4-n-pentylamino-6-chloro-pyrimidine | $C_9H_{15}ClN_4$ | 214.7 | 95–96° | 50.3 | 7.0 | 16.5 | 26.1 |
| | | | | | 49.7 | 7.3 | 16.8 | 26.2 |
| 9 | 2-amino-4-tert-butylamino-6-chloro-pyrimidine | $C_8H_{13}ClN_4$ | 200.7 | 141–142° | 47.9 | 6.5 | 17.7 | 27.9 |
| | | | | | 48.1 | 6.0 | 17.2 | 28.0 |

The agriculturally acceptable acid addition salts of the compounds of formula I, which are also included within the scope of the present invention, may be produced in conventional manner, e.g.: Trichloroacetate of 2-amino-4-isopropylamino-6-chloropyrimidine.

18.6 g (0.1 mol) of 2-amino-4-isopropylamino-6-chloro-pyrimidine are dissolved in 100 cc of alcohol and 18 g (0.11 mols) of trichloroacetic acid are added while cooling. The mixture is evaporated to dryness in a vacuum and the resulting solid, colourless residue is recrystallized from alcohol. The trichloroacetate has a melting point of 150°–152°.

Analysis: $C_7H_{11}ClN_4 \cdot HO_2CCl_3$; Molecular weight: 350: Calculated: C 30.9; H 3.5; Cl 40.5; N 16.0 %; Found: C 31.0; H 3.5; Cl 39.6; N 16.6 %

Hydrochloride of 2-amino-4-isopropylamino-6-chloropyrimidine 18.6 g (0.1 mol) of 2-amino-4-isopropylamino-6-chloro-pyrimidine are dissolved in 100 cc of alcohol and 11 g (0.11 mols) of 36% hydrochloric acid are added while cooling. The mixture is evaporated to dryness in a vacuum and the resulting solid, colourless residue is recrystallized from alcohol. The hydrochloride has a melting point of 235°–236°.

Analysis: $C_7H_{11}ClN_4.HCl$; Molecular weight: 223: Calculated: C 37.7; H 5.4; Cl 31.7; N 25.0 %; Found: C 37.7; H 5.4; Cl 31.8; N 25.1 %

Methanesulphonate of
2-amino-4-sec.butylamino-6-chloro-pyrimidine 20.0 g (0.1 mol) of 2-amino-4-sec.butylamino-6-chloropyrimidine are dissolved in 100 cc of alcohol and 10.5 g (0.11 mols) of methanesulphonate are added to the solution with cooling. The mixture is evaporated to dryness in a vacuum. The resulting solid, very hygroscopic, colourless residue has a M.P. of 116°–118°.

Analysis: $C_8H_{13}ClN_4.CH_3SO_3H$; Molecular weight: 296.5: Calc.: C 36.5; H 5.7; Cl 11.9; S 10.8 %; Found. C 36.8; H 5.4; Cl 12.0; N 19.3; S 10.3 %

Hydrogen sulphate of
2-amino-4-sec.butylamino-6-chloro-pyrimidine 20.0 g (0.1 mol) of 2-amino-4-sec.butylamino-6-chloropyrimidine are dissolved in 100 cc of alcohol and 10.8 g (0.11 mols) of sulphuric acid are added to the solution with cooling. The mixture is evaporated to dryness in a vacuum. The resulting solid, very hygroscopic, colourless residue has a M.P. of 95°–105°.

Analysis: $C_8H_{13}ClN_4.H_2SO_4$; Molecular weight: 298.5: Calc.: C 32.9; H 5.0; Cl 11.9; N 18.8; S 10.7 %; Found: C 32.5; H 4.8; Cl 12.0; N 19.0; S 10.7 %

Phosphate of
2-amino-4-sec.butylamino-6-chloro-pyrimidine 20.0 g (0.1 mol) of 2-amino-4-sec.butylamino-6-chloropyrimidine are dissolved in 100 cc of alcohol and 10.8 g (0.11 mols) of phosphoric acid are added to the solution with cooling. The mixture is evaporated to dryness in a vacuum and the resulting solid, colourless residue is recrystallized from alcohol or acetonitrile. M.P. 176°.

Analysis: $C_8H_{13}ClN_4.H_3PO_4$; Molecular weight: 298.5; Calc.: C 32.9; H 5.3; Cl 11.9; N 18.8; P 10.4 %; Found: C 32.1; H 5.2; Cl 11.8; N 18.2; P 10.4 %

Hydrochloride of
2-amino-4-isobutylamino-6-chloro-pyrimidine 20.0 g (0.1 mol) of 2-amino-4-isobutylamino-6-chloropyrimidine are dissolved in 100 cc of alcohol and 11 g (0.11 mols) of 36.5 % hydrochloric acid are added to the solution with cooling. The mixture is evaporated to dryness in a vacuum and the resulting solid, colourless residue is recrystallized from alcohol or acetronitrile. M.P. 241°.

Analysis: $C_8H_{13}ClN_4.HCl$; Molecular weight: 237: Calc.: C 40.5; H 5.9; Cl 30.0; N 23.6 %; Found: C 40.7; H 6.3; Cl 29.8; N 23.0 %

Trichloroacetate of
2-amino-4-isobutylamino-6-chloro-pyrimidine 20.0 g (0.1 mol) of 2-amino-4-isobutylamino-6-chloropyrimidine are dissolved in 100 cc of alcohol and 18 g (0.11 mols) of trichloroacetic acid are added to the solution with cooling. The mixture is evaporated to dryness in a vacuum and the resulting solid, colourless residue is recrystallized from alcohol or acetonitrile. M.P. 149°.

Analysis: $C_8H_{13}ClN_4.CCl_3COOH$; Molecular weight: 364: Calc.: C 33.0; H 3.8; Cl 39.0; N 15.4 %; Found: C 33.1; H 4.1; Cl 39.0; N 15.1 %

Trichloroacetate of
2-amino-4-n-butylamino-6-chloro-pyrimidine 20.0 g (0.1 mol) of 2-amino-4-n-butylamino-6-chloropyrimidine are dissolved in 100 cc of alcohol and 18 g (0.11 mols) of trichloroacetic acid are added to the solution with cooling. The mixture is evaporated to dryness in a vacuum and the resulting solid, colourless residue is recrystallized from alcohol or acetonitrile. M.P. 137°.

Analysis: $C_8H_{13}ClN_4.CCl_3COOH$; Molecular weight: 364: Calc.: C 33.0; H 3.8; Cl 39.0; N 15.4 %; Found: C 33.0; H 3.8; Cl 39.0; N 15.4 %

Hydrobromide of
2-amino-4-n-butylamino-6-chloro-pyrimidine 20.0 g (0.1 mol) of 2-amino-4-n-butylamino-6-chloropyrimidine are dissolved in 100 cc of alcohol and 14.1 g (0.11 mols) of 63 % hydrobromic acid are added to the solution with cooling. The mixture is evaporated to dryness in a vacuum and the resulting solid, colourless residue is recrystallized from alcohol or acetonitrile. M.P. 233°.

Analysis: $C_8H_{13}ClN_4.HBr$; Molecular weight: 281.5: Calc.: C 34.2; H 5.0; N 19.9 %; Found: C 34.5; H 4.9; N 19.1 %

What is claimed is:

1. The method of combating weeds in a maize locus comprising applying to such a locus the compound of the formula:

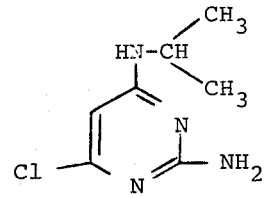

or an agriculturally acceptable acid addition salt thereof, in an amount between 1 to 12 kilograms per hectare.

2. The method of claim 1 wherein between 2 to 6 kilograms per hectare is applied.

3. The method of combating weeds in a wheat locus comprising applying to such a locus the compound of the formula:

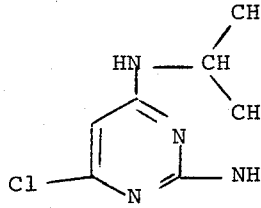

or an agriculturally acceptable acid addition salt thereof, in an amount between 1 to 12 kilograms per hectare.

4. The method of claim 3 wherein between 2 to 6 kilograms per hectare is applied.

5. The method of combating weeds in a potato locus comprising applying to such a locus the compound of the formula:

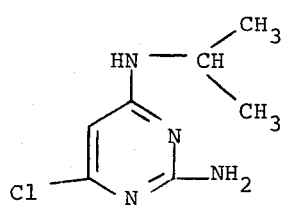

or an agriculturally acceptable acid addition salt thereof, in an amount between 1 to 12 kilograms per hectare.

6. The method of claim 5 wherein between 2 to 6 kilograms per hectare is applied.

7. The method of combating weeds in an onion locus comprising applying to such a locus the compound of the formula:

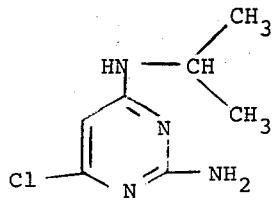

or an agriculturally acceptable acid addition salt thereof, in an amount between 1 to 12 kilograms per hectare.

8. The method of claim 7 wherein between 2 to 6 kilograms per hectare is applied.

9. The method of combating weeds in a leek locus comprising applying to such a locus the compound of the formula:

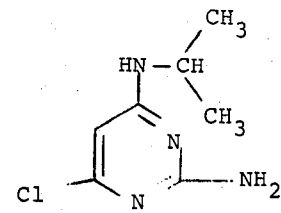

or an agriculturally acceptable acid addition salt thereof, in an amount between 1 to 12 kilograms per hectare.

10. The method of claim 9 wherein between 2 to 6 kilograms per hectare is applied.

* * * * *